United States Patent
Hagio et al.

(10) Patent No.: US 10,894,234 B2
(45) Date of Patent: Jan. 19, 2021

(54) ZEOLITE MEMBRANE HAVING AFX STRUCTURE, MEMBRANE STRUCTURE, AND METHOD FOR MANUFACTURING MEMBRANE STRUCTURE

(71) Applicant: NGK INSULATORS, LTD., Nagoya (JP)

(72) Inventors: Takeshi Hagio, Inazawa (JP); Kenichi Noda, Nagoya (JP); Makoto Miyahara, Tajimi (JP); Katsuya Shimizu, Nagoya (JP)

(73) Assignee: NGK Insultators, Ltd., Nagoya (JP)

( * ) Notice: Subject to any disclaimer, the term of this patent is extended or adjusted under 35 U.S.C. 154(b) by 0 days.

(21) Appl. No.: 16/572,884

(22) Filed: Sep. 17, 2019

(65) Prior Publication Data
US 2020/0023319 A1    Jan. 23, 2020

Related U.S. Application Data

(63) Continuation of application No. PCT/JP2018/010333, filed on Mar. 15, 2018.

(30) Foreign Application Priority Data

Mar. 31, 2017   (JP) ................................ 2017-071566
Mar. 5, 2018    (WO) .................. PCT/JP2018/008312

(51) Int. Cl.
| | |
|---|---|
| *B01D 69/02* | (2006.01) |
| *B01D 71/02* | (2006.01) |
| *C01B 39/04* | (2006.01) |
| *B01D 69/10* | (2006.01) |
| *B01D 69/12* | (2006.01) |

(52) U.S. Cl.
CPC ............. *B01D 69/12* (2013.01); *B01D 69/02* (2013.01); *B01D 69/10* (2013.01); *B01D 71/028* (2013.01); *C01B 39/04* (2013.01)

(58) Field of Classification Search
CPC .............................. B01D 71/028; C01B 39/54
See application file for complete search history.

(56) References Cited

U.S. PATENT DOCUMENTS

| | | |
|---|---|---|
| 2014/0360938 A1 | 12/2014 | Hayashi et al. |
| 2016/0137518 A1 | 5/2016 | Rivas-Cardona et al. |
| 2017/0291135 A1 | 10/2017 | Noda |
| 2017/0296980 A1 | 10/2017 | Noda |

(Continued)

FOREIGN PATENT DOCUMENTS

| | | |
|---|---|---|
| JP | 2016-147801 A1 | 8/2016 |
| JP | 2016-169139 A1 | 9/2016 |
| JP | 2016-204245 A1 | 12/2016 |

(Continued)

OTHER PUBLICATIONS

Emi Mitani et al., "High Functionality of AFX Zeolite by Hydrothermal Conversion Method of FAU Zeolite," Lecture Abstracts of 119th Catalyst Symposium, Mar. 10, 2017, p. 188 (with English translation).

(Continued)

*Primary Examiner* — Bradley R Spies
(74) *Attorney, Agent, or Firm* — Burr & Brown, PLLC

(57) ABSTRACT

A peak intensity of a (004) plane is greater than or equal to 3 times a peak intensity of a (110) plane in an X-ray diffraction pattern obtained by irradiation of X-rays to a membrane surface of an AFX membrane.

7 Claims, 4 Drawing Sheets

(56) References Cited

U.S. PATENT DOCUMENTS

2017/0296983 A1  10/2017  Noda
2017/0348679 A1  12/2017  Naraki

FOREIGN PATENT DOCUMENTS

| WO | 2013/125660 A1 | 8/2013 |
| WO | 2016/121887 A1 | 8/2016 |
| WO | 2016/121888 A1 | 8/2016 |
| WO | 2016/121889 A1 | 8/2016 |

OTHER PUBLICATIONS

International Search Report and Written Opinion (Application No. PCT/JP2018/010333) dated May 1, 2018.
International Search Report and Written Opinion (Application No. PCT/JP2018/008312) dated Apr. 24, 2018.
English translation of International Preliminary Report on Patentability (Application No. PCT/JP2018/008312) dated Oct. 1, 2019.
English translation of International Preliminary Report on Patentability (Chapter I) (Application No. PCT/JP2018/010333) dated Oct. 10, 2019, 7 pages.

ZEOLITE MEMBRANE HAVING AFX STRUCTURE, MEMBRANE STRUCTURE, AND METHOD FOR MANUFACTURING MEMBRANE STRUCTURE

TECHNICAL FIELD

The present invention relates to a zeolite membrane having an AFX structure, a membrane structure, and a method for manufacturing a membrane structure.

BACKGROUND ART

In recent years, techniques for separating and concentrating desired components from a gas mixture or a liquid mixture using zeolite membranes have been proposed.

Specifically, a zeolite membrane having a DDR structure, a zeolite membrane having an LTA structure, a zeolite membrane having an FAU structure, a zeolite membrane having an MFI structure, and a zeolite membrane having a CHA structure are known as zeolite membranes for gas separation, for example (see WO 2013/125660).

Furthermore, a zeolite membrane having an LTA structure, a zeolite membrane having an MOR structure, a zeolite membrane having an FER structure, and a zeolite membrane having a CHA structure are known as zeolite membranes for liquid separation, for example (see WO 2013/125660).

SUMMARY

However, there has been no report indicating success in forming zeolite membranes having an AFX structure.

Development of practicable zeolite membranes having an AFX structure have been expected.

The present invention was made in light of the above-described circumstances, and aims to provide a practicable zeolite membrane having an AFX structure, and a method for manufacturing the same.

Peak intensity of a (004) plane is 3 times or more peak intensity of a (110) plane in an X-ray diffraction pattern obtained by irradiation of X-rays to a membrane surface of a zeolite membrane having an AFX structure according to the present invention.

According to the present invention, it is possible to provide a zeolite membrane having an AFX structure, a membrane structure, and a method for manufacturing a membrane structure that are practicable.

DESCRIPTION OF EMBODIMENTS

Membrane Structure 1

Figure 1:
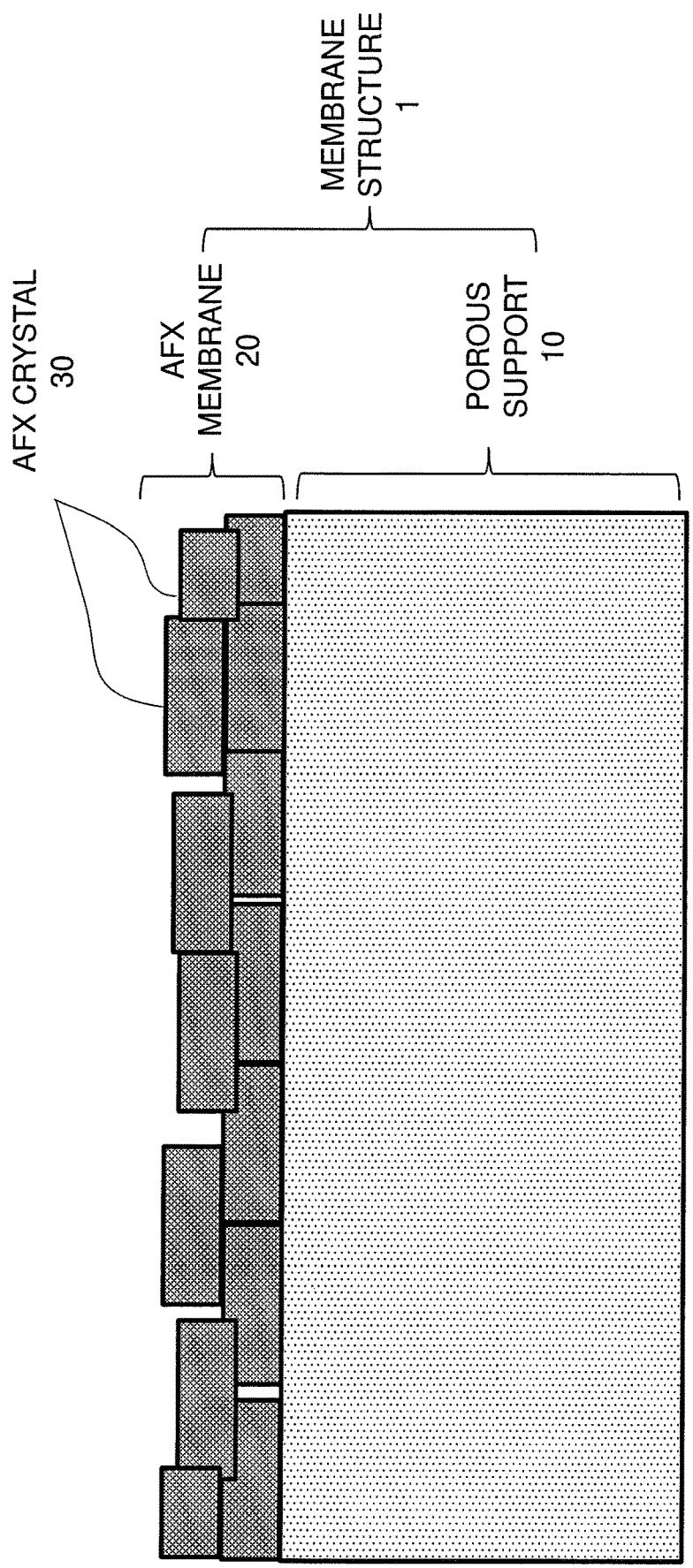
FIG. 1 is a cross-sectional view of a zeolite membrane having an AFX structure.
Figure 2:
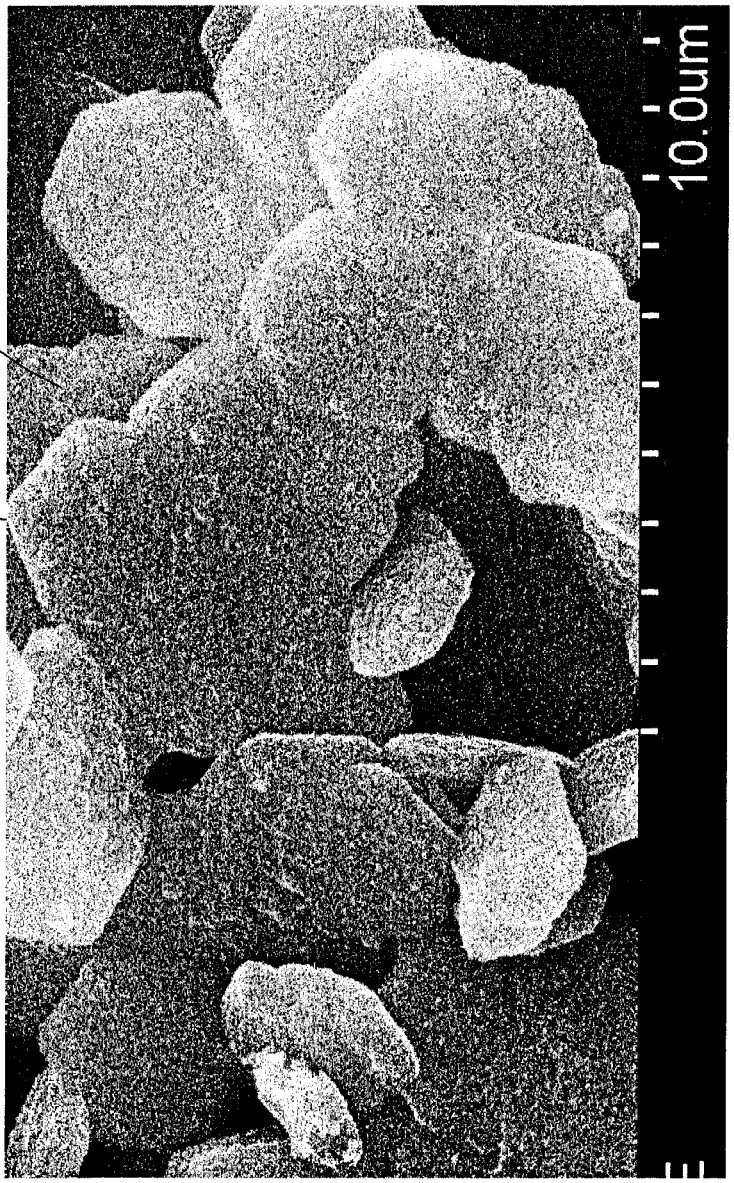
FIG. 2 is a plane view of a zeolite membrane having an AFX structure.

FIG. 1 is a cross-sectional view of a membrane structure 1. FIG. 2 is a plane view of a zeolite membrane 20 having an AFX structure.

The membrane structure 1 includes a porous support 10 and a zeolite membrane 20 having an AFX structure. The zeolite membrane 20 having an AFX structure is constituted by zeolite crystals 30 having an AFX structure.

In the following description, the zeolite membrane 20 having an AFX structure is abbreviated as an "AFX membrane 20", and the zeolite crystals 30 having an AFX structure are abbreviated as "AFX crystals 30".

1. Porous Support 10

The porous support 10 supports the AFX membrane 20. The porous support 10 has chemical stability to an extent that the AFX membrane 20 can be formed (crystallized, applied, or deposited) on a surface of the porous support 10 in the form of a membrane.

The porous support 10 is a ceramic sintered body. Alumina, silica, mullite, zirconia, titania, yttria, silicon nitride, silicon carbide, ceramic sand, cordierite, or the like can be used as the aggregate of the porous support 10. The porous support 10 may contain a binding material. A glass material containing silicon (Si), aluminum (Al), titanium (Ti), or the like can be used as the binding material. The content of the binding material may be set to be 20 vol % or more and 40 vol % or less, but is not limited thereto.

The porous support 10 need only have a shape according to which a fluid mixture (gas mixture or liquid mixture) to be subjected to separation can be supplied to the AFX membrane 20. Examples of the shape of the porous support 10 include a monolith-shape, a flat plate shape, a tubular shape, a cylindrical shape, a columnar shape, and a prismatic shape. A monolith-shape refers to a shape having a plurality of cells provided in the longitudinal direction, and has a honeycomb shape. If the porous support 10 has a monolith-shape, the length thereof in the longitudinal direction can be set to 150 to 2000 mm, and the diameter thereof in the radial direction can be set to 30 to 220 mm, but there is no limitation thereon. If the porous support 10 has a monolith-shape, it is possible to form 30 to 2500 channels having a diameter of 1 to 5 mm in the porous support 10.

The porous support 10 is a porous body having multiple open pores. An average pore size of the porous support 10 need only be a size at which a permeation component of the fluid mixture that has permeated through the AFX membrane 20 can pass through pores. The amount of a permeation component can be increased by increasing the average pore size of the porous support 10. The strength of the porous support 10 can be increased by reducing the average pore size of the porous support 10. The average pore size of the porous support 10 is not particularly limited, and can be 0.01 µm or more and 5 µm or less, for example. The average pore size of the porous support 10 can be measured depending on the size of pores using a mercury intrusion method, an air-flow method described in ASTM F316, or perm porometry. The porosity of the porous support 10 is not particularly limited, and can be 25% to 50%, for example.

The average particle size of the porous support 10 is not particularly limited, and can be 0.1 µm or more and 100 µm or less, for example. The average particle size of the porous support 10 refers to an arithmetic average value of the maximum diameters of 30 particles that are measured through cross-sectional observation using a SEM (Scanning Electron Microscope). 30 particles to be measured need only be selected in a SEM image at random.

The porous support 10 may have a monolayer structure in which pores have a uniform size, or a multilayer structure in which pores have different sizes. If the porous support 10 has a multilayer structure, it is preferable that the closer a layer is to the AFX membrane 20, the smaller the average pore size is. If the porous support 10 has a multilayer structure, the average pore size of the porous support 10 refers to an average pore size of an outermost layer that is in contact with the AFX membrane 20. If the porous support 10 has a multilayer structure, each layer can be constituted by at least one selected from the above-described materials, and materials constituting layers may be different from each other.

2. AFX Membrane 20

The AFX membrane 20 is formed on a surface of the porous support 10. The thickness of the AFX membrane 20 is not particularly limited, and can be set to 0.1 µm or more and 10 µm or less. The AFX membrane 20 preferably has a thickness of 0.3 µm or more, and more preferably has a thickness of 0.5 µm or more, in consideration of sufficiently bonding crystals. The AFX membrane 20 preferably has a thickness of 5 µm or less, and more preferably has a thickness of 3 µm or less, in consideration of suppressing cracking caused by thermal expansion.

The AFX membrane 20 is formed in the form of a membrane as a result of a plurality of AFX crystals 30 being linked to each other. Each AFX crystal 30 is a crystal constituted by a zeolite having an AFX structure. The AFX structure refers to a type of structure that meets the definition of an AFX type structure under the IUPAC structure codes as defined by the Structure Commission in the International Zeolite Association.

Examples of zeolites constituting AFX crystals 30 include a zeolite in which atoms (T atoms) located at centers of oxygen tetrahedrons ($TO_4$) constituting the zeolite are constituted by Si and Al, an AlPO zeolite in which T atoms are constituted by Al and P (phosphorus), an SAPO zeolite in which T atoms are constituted by Si, Al, and P, an MAPSO zeolite in which T atoms are constituted by magnesium (Mg), Si, Al, and P, and a ZnAPSO zeolite in which T atoms are constituted by zinc (Zn), Si, Al, and P. A portion of T atoms may be substituted by other elements.

Each AFX crystal 30 internally has a plurality of oxygen 8-membered ring pores. An oxygen 8-membered ring pore refers to a pore constituted by an oxygen 8-membered ring. An oxygen 8-membered ring is also simply referred to as an "8-membered ring", and is a portion in which the number of oxygen atoms constituting the pore framework is eight, and oxygen atoms are linked to the above-described T atoms to form a ring structure.

Each AFX crystal 30 may contain a metal or metal ion for the purpose of providing a specific component with adsorptivity. Examples of such a metal or metal ion include one or more selected from the group consisting of alkali metals, alkaline earth metals, and transition metals. Although specific examples of transition metals include platinum (Pt), palladium (Pd), rhodium (Rh), silver (Ag), iron (Fe), copper (Cu), cobalt (Co), manganese (Mn), and indium (In), there is no limitation thereon.

Each AFX crystal 30 is formed in a plate shape. Although there is no particular limitation on a planar shape of each AFX crystal 30 and the planar shape thereof may be a polygon other than a triangle, or an indeterminate form, a hexagon is particularly preferable. If each AFX crystal 30 has a hexagonal shape, the AFX crystal 30 has higher crystallinity than that of an AFX crystal having an indeterminate form, a spherical shape, or an elliptical spherical shape, and it is possible to obtain a membrane having better durability.

As shown in FIGS. 1 and 2, the plate-shaped AFX crystals 30 are arranged side-by-side on the surface of the porous support 10. The AFX crystals 30 are disposed in a state of being laid in a plane direction perpendicular to the thickness direction of the AFX membrane 20.

Here, c planes are both main faces of each AFX crystal 30, and a planes are the side surfaces thereof. As described above, the AFX crystals 30 are arranged side-by-side on the surface of the porous support 10, and thus the c planes, which are main faces, are exposed at the membrane surface of the AFX membrane 20.

The peak intensity of a (004) plane is 3 times or more the peak intensity of a (110) plane in an X-ray diffraction pattern obtained by irradiation of X-rays to the membrane surface of the AFX membrane 20 using an X-ray diffraction (XRD) method. This means that the abundance ratio of the AFX crystals 30 that are arranged side-by-side on the surface of the porous support 10 is high. Thus, as a result of making the peak intensity of the (004) plane be 3 times or more the peak intensity of the (110) plane, the c planes, which are the main faces, of adjacent AFX crystals 30 can be joined to each other, and thus the connectivity of adjacent AFX crystals 30 can be increased. Thus, it is possible to inhibit the formation of gaps between AFX crystals 30 and improve the separation performance of the AFX membrane 20 to a practicable level.

In an X-ray diffraction pattern, the peak intensity of the (004) plane is preferably 3.5 times or more the peak intensity of the (110) plane, and is more preferably 4 times or more the peak intensity of the (110) plane. This makes it possible to further improve the separation performance of the AFX membrane 20.

The peak intensity refers to a value obtained by subtracting a background value from a measured value. An X-ray diffraction pattern can be obtained by irradiation of CuKα-rays to the membrane surface of the AFX membrane 20 using an X-ray diffraction apparatus (manufactured by Rigaku Corporation, model MiniFlex600). The X-ray output is 600 W (tube voltage: 40 kV, tube current: 15 mA), scan speed is 0.5 degrees/min, a scan step is 0.02 degrees, and an Ni foil having a thickness of 0.015 mm is used as a CuKβ-ray filter. A peak of the (004) plane is observed around 2θ=18 degrees, and a peak of the (110) plane is observed around 2θ=13 degrees.

Method for Manufacturing Membrane Structure 1

1. Preparation of Porous Support 10

A compact is formed by molding a ceramic material into a desired shape using an extrusion molding method, a press molding method, a slip cast molding method, or the like.

Then, if the porous support 10 has a multilayer structure, slurry containing a ceramic material is applied onto a surface of the compact using a filtration method.

The compact is fired (for example, 900 degrees C. to 1450 degrees C.) to thereby form the porous support 10. The porous support 10 may have an average pore size of 0.01 µm or more and 5 µm or less.

2. Preparation of Seed Crystals

DDR crystals are synthesized according to a method disclosed in WO 2010/90049.

Then, a starting material solution is prepared by dissolving or dispersing T atom sources such as a silicon source, an aluminum source, a phosphorus source or the like and a structure-directing agent (SDA) in pure water. T atoms preferably include two or more of Si, Al, and P, and more preferably include at least Al, P, and O because the crystallinity of AFX can be improved. Colloidal silica, fumed silica, tetraethoxysilane, sodium silicate, or the like can be used as a silicon source, for example. Aluminum isopropoxide, aluminum hydroxide, sodium aluminate, alumina sol, or the like can be used as an aluminum source, for example. Phosphoric acid, sodium dihydrogen phosphate, ammonium dihydrogen phosphate, or the like can be used as a phosphorus source, for example. N,N,N',N'-tetramethyldiaminohexane, tetraethylammonium hydroxide, 1,4-diazabicyclo[2,2,2] octane-C4-diquat dibromide, 1,3-di(1-adamantyl)imidazolium dibromide, or the like can be used as a structure-directing agent, for example.

Then, hexagonal plate-shaped AFX seed crystals are synthesized by adding a small amount of the synthesized DDR crystals to the starting material solution, then introducing the resulting mixture to a pressure vessel, and performing hydrothermal synthesis (180 to 200 degrees C., 10 to 100 hours). At this time, the size of AFX seed crystals is adjusted to an extent that AFX seed crystals are not locked to openings of pores formed on the surface of the porous support 10 in a state of being disposed extending upward from the openings of pores. The size of AFX seed crystals can be adjusted by changing the amount of added DDR crystals, the composition of the starting material solution, a synthesis time, or the like. The length of a straight line connecting opposing corners of a hexagonal plate-shaped AFX seed crystal in a plane view can be set to 0.15 μm to 5 μm, for example.

3. Formation of AFX Membrane 20

A seed crystal dispersion solution is prepared by dispersing AFX seed crystals in water, an alcohol such as ethanol or isopropanol, or a mixed solution thereof.

Figure 3:
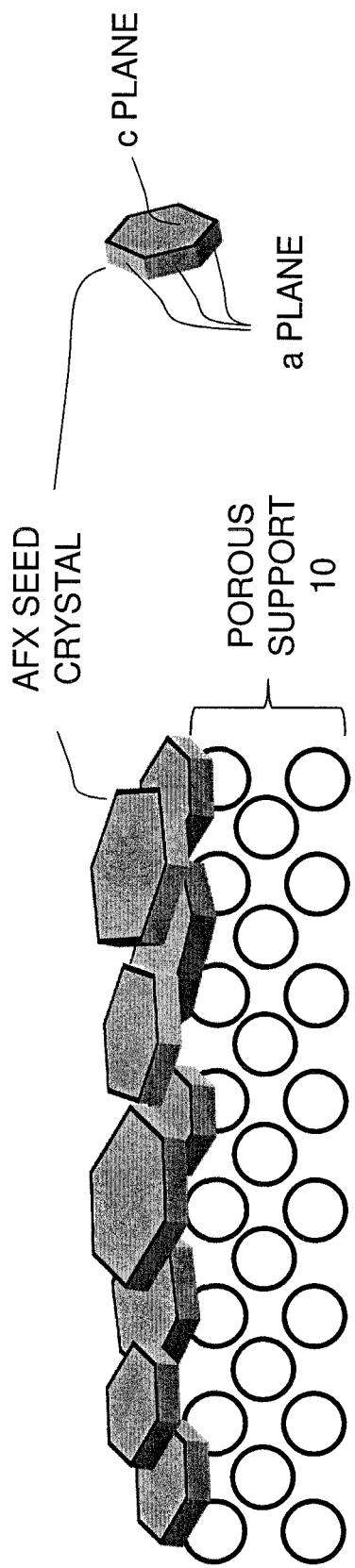
FIG. 3 is a diagram illustrating a method for manufacturing a zeolite membrane having an AFX structure.

Then, as a result of making the seed crystal dispersion solution flow over the surface of the porous support 10, AFX seed crystals are attached to the surface of the porous support 10. At this time, as shown in FIG. 3, AFX seed crystals are not locked to openings of pores formed on the surface of the porous support 10 in a state of being disposed extending upward from the openings of pores, and thus AFX seed crystals are disposed in a state of being arranged side-by-side on the surface of the porous support 10. In order to attach AFX seed crystals to the surface of the porous support 10 in a state in which the AFX seed crystals are arranged side-by-side on the surface of the porous support 10, the speed at which the dispersion solution flows is preferably 30 mm/s or more, and is more preferably 50 mm/s.

Then, a starting material solution is prepared by dissolving or dispersing T atom sources such as a silicon source, an aluminum source, and a phosphorus source, and a structure-directing agent (SDA) in pure water.

Figure 4:
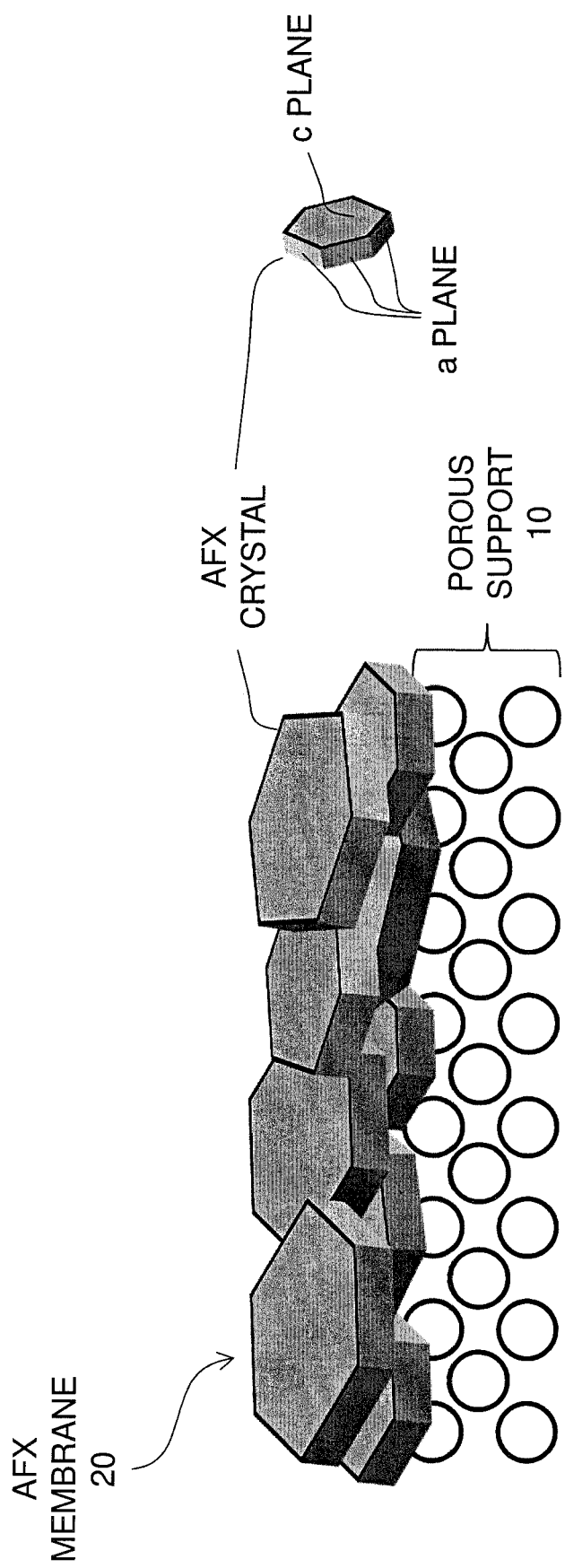
FIG. 4 is a diagram illustrating a method for manufacturing a zeolite membrane having an AFX structure.

Then, the porous support 10 with AFX seed crystals attached is immersed into the starting material solution and hydrothermal synthesis is performed (150 to 190 degrees C., 5 to 60 hours). At this time, AFX seed crystals directly undergo crystal growth in a state in which AFX seed crystals are arranged side-by-side on the surface of the porous support 10, and thus, as shown in FIG. 4, AFX crystals 30 arranged side-by-side on the surface of the porous support 10 grow, and are joined to each other, thus forming the AFX membrane 20.

EXAMPLES

Examples of the present invention will be described below. However, the present invention is not limited to the examples described below.

Example 1

1. Preparation of Porous Support

A monolith-shaped compact having a plurality of through holes was formed from a green body containing an alumina raw material by an extrusion molding method, and then was fired.

Then, a porous layer including alumina as a main component was formed on surfaces of through holes of the fired compact, and the resulting compact was fired again to form a porous support. A surface of the porous support on which a membrane is to be formed had an average pore size of 65 to 110 nm.

2. Preparation of Seed Crystals

DDR crystals were synthesized through hydrothermal synthesis (160 degrees C., 16 hours) according to the above-described method disclosed in WO 2010/90049, and the synthesized DDR crystals were sufficiently washed. The DDR crystals had an average particle size of 196 nm.

A starting material solution having a composition of 4.1 SDA:1.7 $SiO_2$:1 $Al_2O_3$:2.1 $P_2O_5$:1525 $H_2O$ was prepared by dissolving, in pure water, colloidal silica as a silicon source, aluminum isopropoxide as an aluminum source, 85% phosphoric acid as a phosphorus source, and N,N,N',N'-tetramethyldiaminohexane, as a structure-directing agent.

Then, a small amount of DDR crystals was added to the raw material solution and the resulting mixture was introduced into a pressure vessel, and hydrothermal synthesis (190 degrees C., 20 hours) was performed.

Then, seed crystals obtained through hydrothermal synthesis were collected and sufficiently washed with pure water, and then were completely dried at 65 degrees C.

Then, when a crystal phase was checked through X-ray diffraction measurement, and outer shapes of seed crystals were checked using a SEM, the obtained seed crystals were hexagonal plate-shaped AFX crystals. A straight line connecting opposing corners of an AFX crystal in a plane view had a length of 2 to 6 μm.

3. Formation of AFX Membrane

A seed crystal dispersion solution was prepared by dispersing the AFX seed crystals in ethanol.

Then, as a result of making the seed crystal dispersion solution flow through channels of the porous support at a speed of 50 mm/s, AFX seed crystals were attached to inner surfaces of the channels of the porous support. As described above, because the porous support had an average pore size of about 100 nm, and a plate-shaped AFX seed crystal had a diagonal length of 2 to 6 μm, AFX seed crystals were arranged side-by-side without being locked to openings of pores of the porous support.

Then, a starting material solution having a composition of 2.5 SDA:0.75 $SiO_2$:1 $Al_2O_3$:1.25 $P_2O_5$:165 $H_2O$ was prepared by dissolving, in pure water, colloidal silica as a silicon source, aluminum isopropoxide as an aluminum source, 85% phosphoric acid as a phosphorus source, and N,N,N',N'-tetramethyldiaminohexane as a structure-directing agent.

An AFX membrane was synthesized by immersing the porous support with AFX seed crystals attached into the starting material solution and performing hydrothermal synthesis (170 degrees C., 50 hours).

Then, the synthesized AFX membrane was sufficiently washed with pure water, and then was completely dried at 90 degrees C. After drying, the $N_2$ permeation amount of the AFX membrane was measured and found to be 0.9 nmol/$m^2$·s·Pa or less. Accordingly, it was confirmed that the AFX membrane according to Example 1 had a practicable degree of denseness.

Then, SDA was burned off through heat treatment at 500 degrees C. for 20 hours so that pores passed through the AFX membrane.

Then, in a separation test using a mixed gas of $CO_2$/$CH_4$ (50:50) at 0.15 MPaG the AFX membrane, of which both end portions of the porous support were sealed with a sealing material, demonstrated a $CO_2/CH_4$ permeance ratio of 78. Similarly, in a separation test using a mixed gas of $N_2/CH_4$ (50:50) at 0.3 MPaG, the AFX membrane, of which both end portions of the porous support were sealed with a sealing material, demonstrated a $N_2/CH_4$ permeance ratio of 2.5. Accordingly, it was confirmed that the AFX membrane according to Example 1 had sufficiently practicable separation performance.

The peak intensity of the (004) plane was 3.7 times the peak intensity of the (110) plane in an X-ray diffraction pattern obtained by irradiation of X-rays to the AFX membrane surface. Accordingly, it was confirmed that in the AFX membrane according to Example 1, c planes of the AFX crystals were arranged on the membrane surface.

Example 2

1. Preparation of Porous Support

A porous support was prepared in the same process as that of Example 1.

2. Preparation of Seed Crystals

AFX seed crystals were prepared in the same process as that of Example 1.

3. Formation of AFX Membrane

An AFX membrane was synthesized in the same process as that of Example 1, except that the composition of the starting material solution was changed to 1 $Al_2O_3$:2.1 $P_2O_5$:2.8 SDA:850 $H_2O$, and hydrothermal synthesis conditions were changed to 170 degrees C. for 45 hours.

Then, the synthesized AFX membrane was sufficiently washed with pure water, and then was completely dried at 90 degrees C. After drying, the $N_2$ permeation amount of the AFX membrane was measured and found to be 0.2 nmol/$m^2 \cdot s \cdot Pa$ or less. Accordingly, it was confirmed that the AFX membrane according to Example 2 had sufficiently practicable denseness.

Then, SDA was burned off through heat treatment at 450 degrees C. for 50 hours so that pores passed through the AFX membrane.

Then, in a separation test using a mixed gas of $CO_2/CH_4$ (50:50) at 0.15 MPaG, the AFX membrane, of which both end portions of the porous support were sealed with a sealing material, demonstrated a $CO_2/CH_4$ permeance ratio of 147. Similarly, in a separation test using a mixed gas of $N_2/CH_4$ (50:50) at 0.3 MPaG, the AFX membrane, of which both end portions of the porous support were sealed with a sealing material, demonstrated a $N_2/CH_4$ permeance ratio of 5.8. Accordingly, it was confirmed that the AFX membrane according to Example 2 had sufficiently practicable separation performance.

The peak intensity of the (004) plane was 4.1 times the peak intensity of the (110) plane in an X-ray diffraction pattern obtained by irradiation of X-rays to the AFX membrane surface. Accordingly, it was confirmed that in the AFX membrane according to Example 2, c planes of the AFX crystals were arranged on the membrane surface.

The invention claimed is:

1. A zeolite membrane having an AFX structure, wherein a peak intensity of a (004) plane is greater than or equal to 3 times a peak intensity of a (110) plane in an X-ray diffraction pattern obtained by irradiation of X-rays to a membrane surface of the zeolite membrane.

2. The zeolite membrane having an AFX structure according to claim 1, wherein the peak intensity of the (004) plane is greater than or equal to 3.5 times the peak intensity of the (110) plane.

3. The zeolite membrane having an AFX structure according to claim 1, the zeolite membrane comprising two or more of Si, Al, and P.

4. The zeolite membrane having an AFX structure according to claim 3, the zeolite membrane comprising at least Si, Al, P, and O.

5. The zeolite membrane having an AFX structure according to claim 3, the zeolite membrane comprising at least Si, Al, and O.

6. A membrane structure comprising:
the zeolite membrane having an AFX structure according to claim 1; and
a porous support configured to support the zeolite membrane having an AFX structure.

7. A method for manufacturing a membrane structure, comprising:
attaching plate-shaped seed crystals having an AFX structure to a surface of a porous support; and
immersing the porous support into a starting material solution and performing hydrothermal synthesis, wherein
the plate-shaped seed crystals having an AFX structure are arranged side-by-side on the surface of the porous support in the step of attaching the plate-shaped seed crystals having an AFX structure to the surface of the porous support.

* * * * *